US010724395B2

(12) United States Patent
Kupratis et al.

(10) Patent No.: US 10,724,395 B2
(45) Date of Patent: Jul. 28, 2020

(54) TURBOFAN WITH MOTORIZED ROTATING INLET GUIDE VANE

(71) Applicant: United Technologies Corporation, Farmington, CT (US)

(72) Inventors: Daniel Bernard Kupratis, Wallingford, CT (US); Sean Danby, East Hampton, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 16/148,442

(22) Filed: Oct. 1, 2018

(65) Prior Publication Data
US 2020/0102849 A1   Apr. 2, 2020

(51) Int. Cl.
| F01D 17/16 | (2006.01) |
| F01D 9/04 | (2006.01) |
| F01D 15/10 | (2006.01) |
| H02K 7/18 | (2006.01) |

(52) U.S. Cl.
CPC ........... *F01D 17/162* (2013.01); *F01D 9/041* (2013.01); *F01D 15/10* (2013.01); *H02K 7/1823* (2013.01); *F05D 2220/32* (2013.01); *F05D 2240/12* (2013.01); *F05D 2260/14* (2013.01); *F05D 2270/05* (2013.01)

(58) Field of Classification Search
CPC ........ F01D 17/162; F01D 9/041; F01D 15/10; H02K 7/1823
See application file for complete search history.

(56) References Cited

U.S. PATENT DOCUMENTS

| 5,437,539 A | * | 8/1995 | Gysling | F04D 3/00 415/146 |
| 7,140,832 B2 | | 11/2006 | Jacks | |
| 8,099,944 B2 | * | 1/2012 | Foster | F02C 6/18 60/226.1 |
| 8,549,833 B2 | * | 10/2013 | Hyde | F02C 6/00 60/204 |
| 8,857,191 B2 | | 10/2014 | Hyde et al. | |
| 9,181,900 B1 | | 11/2015 | Lugg | |
| 9,835,044 B2 | | 12/2017 | Lecordix | |
| 2006/0222482 A1 | * | 10/2006 | Jacks | F01D 9/041 415/1 |
| 2007/0101721 A1 | * | 5/2007 | Dooley | F01D 15/10 60/721 |

(Continued)

FOREIGN PATENT DOCUMENTS

EP    1905986    4/2008

OTHER PUBLICATIONS

EP Search Report for EP Application No. 19200813.4 dated Feb. 3, 2020.

*Primary Examiner* — Sean Gugger
(74) *Attorney, Agent, or Firm* — Carlson, Gaskey & Olds, P.C.

(57) ABSTRACT

A gas turbine engine includes a turbine section that is configured to drive a fan through a fan shaft. The fan includes a plurality of fan blades rotatable about an axis of rotation of the gas turbine engine. A fan nacelle includes a first electrical machine component. The fan is located within the fan nacelle. A plurality of fan inlet guide vanes includes a second electrical machine component. The plurality of fan inlet guide vanes are rotatable about the axis.

22 Claims, 3 Drawing Sheets

(56) References Cited

U.S. PATENT DOCUMENTS

| | | | |
|---|---|---|---|
| 2008/0098718 A1* | 5/2008 | Henry | F02C 3/067 |
| | | | 60/226.1 |
| 2008/0317587 A1 | 12/2008 | Lord | |
| 2013/0019585 A1 | 1/2013 | Merry | |
| 2016/0123174 A1* | 5/2016 | Ettridge | F01D 19/00 |
| | | | 290/46 |
| 2018/0118368 A1* | 5/2018 | Sands | B64D 27/18 |
| 2018/0216632 A1* | 8/2018 | Conner | F01D 9/041 |
| 2019/0078460 A1* | 3/2019 | Menheere | F04D 29/563 |
| 2019/0211702 A1* | 7/2019 | Vonfelt | F01D 9/041 |
| 2019/0233125 A1* | 8/2019 | Knight | B64D 13/02 |

\* cited by examiner

TURBOFAN WITH MOTORIZED ROTATING INLET GUIDE VANE

BACKGROUND

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. The compressor section typically includes low and high pressure compressors, and the turbine section includes low and high pressure turbines.

The turbine section drives a fan that provides a substantial portion of thrust generated by the engine. Guide vanes aft of the fan direct airflow into the compressor section to increase compressor efficiency. Airflow into the fan maybe directed to some extent by a nacelle structure surrounding the fan blades, but otherwise is not pre-conditioned.

SUMMARY

In one exemplary embodiment, a gas turbine engine includes a turbine section that is configured to drive a fan through a fan shaft. The fan includes a plurality of fan blades rotatable about an axis of rotation of the gas turbine engine. A fan nacelle includes a first electrical machine component. The fan is located within the fan nacelle. A plurality of fan inlet guide vanes includes a second electrical machine component. The plurality of fan inlet guide vanes are rotatable about the axis.

In a further embodiment of the above, the first and second electrical machine components are configured to control rotation of the plurality of fan inlet guide vanes.

In a further embodiment of any of the above, a controller is configured to communicate with the first electrical machine component to rotate the plurality of inlet guide vanes, hold the plurality of inlet guide vanes in a fixed position, or allow the plurality of inlet guide vanes to windmill.

In a further embodiment of any of the above, the first and second electrical machine components are configured to generate electrical power when the plurality of inlet guide vanes windmill.

In a further embodiment of any of the above, an electrical storage device is in communication with the controller.

In a further embodiment of any of the above, the first electrical machine component includes a plurality of electrical stator windings. The second electrical machine component includes at least one permanent magnet.

In a further embodiment of any of the above, the fan is supported by a first bearing system on the fan shaft. Each of the plurality of fan inlet guide vanes extend from an inner diameter associated with a second bearing system located on a fan hub to an outer diameter associated with a shroud.

In a further embodiment of any of the above, the shroud is configured to be received in a recess of the fan nacelle. The shroud comprises the second electrical machine component as a permanent magnet. The first electrical machine component comprises a plurality of electrical stators associated with the recess of the fan nacelle.

In a further embodiment of any of the above, the fan is supported by a first bearing system on the fan shaft. Each of the plurality of fan inlet guide vanes extend from an inner diameter associated with a second bearing system located on a fan hub to an outer free end.

In a further embodiment of any of the above, a portion of each of the plurality of fan inlet guide vanes includes the second electrical machine component. The second electrical machine component is a permanent magnet.

In a further embodiment of any of the above, the plurality of fan inlet guide vanes are rotatable independent of the fan and in a direction opposite to the fan.

In a further embodiment of any of the above, a geared architecture is driven by the turbine section. The geared architecture drives the fan at a speed different than the turbine section.

In a further embodiment of any of the above, the fan nacelle includes a variable area fan nozzle configured to vary a fan nozzle exit area.

In another exemplary embodiment, a method of operating a turbofan engine includes rotating a fan assembly within a fan nacelle about a gas turbine engine axis. The rotation of a fan inlet guide vane assembly about the gas turbine engine axis is controlled using at least one electrical machine component located in the fan nacelle.

In a further embodiment of any of the above, the method includes imparting a predefined direction of airflow into the fan assembly using the fan inlet guide vane assembly.

In a further embodiment of any of the above, the method includes inducing the fan inlet guide vane assembly to rotate by generating a magnetic field with at least one electrical machine component.

In a further embodiment of any of the above, the method includes rotating the fan inlet guide vane assembly in a direction opposite the fan.

In a further embodiment of any of the above, the method includes holding the fan inlet guide vane assembly in a fixed position with the at least one electrical machine component.

In a further embodiment of any of the above, the method includes windmilling the fan inlet guide vane assembly.

In a further embodiment of any of the above, the method includes generating electrical power using the at least one electrical machine component.

DETAILED DESCRIPTION

Figure 1:
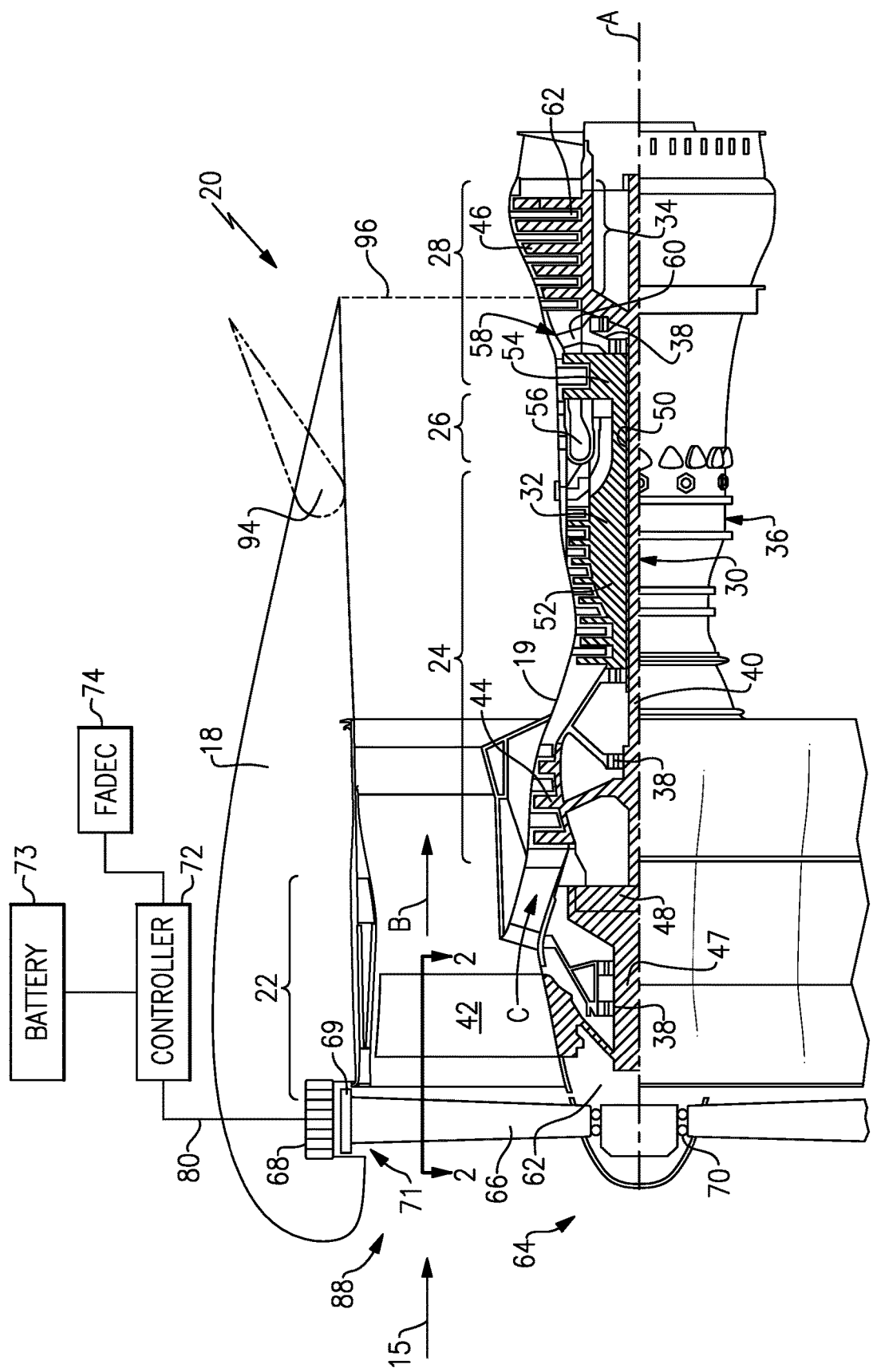
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a fan nacelle 18, and also drives air into a core nacelle 19 along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to a fan shaft 47 of fan section 22 through a speed change mechanism, which in exemplary gas turbine engine 20 is illustrated as a geared architecture 48 to drive fan blades 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 58 of the engine static structure 36 may be arranged generally between the high pressure turbine 54 and the low pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 58 includes airfoils 60 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and geared architecture 48 may be varied. For example, geared architecture 48 may be located aft of the low pressure compressor 44 and the fan blades 42 may be positioned forward or aft of the location of the geared architecture 48 or even aft of turbine section 28.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition —typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

The example gas turbine engine includes the fan section 22 that comprises in one non-limiting embodiment less than about 26 fan blades 42. In another non-limiting embodiment, the fan section 22 includes less than about 20 fan blades 42. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

The gas turbine engine 20 includes an example inlet guide vane system 64 axially forward of the fan section 22 for providing a beneficial pre-swirl and direction to inlet airflow 15 to the fan section 22. The inlet guide vane system 64 includes a plurality of inlet guide vanes 66 that are rotatable about the engine axis A independent of rotation of the fan blades 42.

The inlet guide vane system 64 is utilized to precondition and direct inlet airflow 15 entering the fan section 22. The preconditioning or direction of airflow entering the fan section 22 provided by the inlet guide vane system 64 enhances efficiency of the fan section 22. Moreover, the inlet guide vane system 64 provides for the adjustment of a fan pressure ratio by driving the inlet guide vanes 66 located axially forward of the fan blades 42 to preswirl airflow into the fan blades 42. The inlet guide vane system 64 may also be utilized to generate electrical power.

The fan blades 42 are supported by a fan hub 62, and are rotated by the fan shaft 47 which is supported by bearing system 38. In this example, the fan shaft 47 is driven by an output of geared architecture 48. Accordingly, the fan section 22 rotates at a slower speed than the low pressure turbine 46 driving the fan section 22. Although the disclosed example includes a geared architecture 48 to drive the fan section 22, direct drive engines would also benefit from this disclosure and are within the contemplation and scope of this disclosure.

The inlet guide vanes 66 extend radially outward from a second bearing system 70 located on the fan hub 62 to an outer end 71. A first electrical machine component, in this example electrical stator windings 68, is located within the fan nacelle 18, and a second electrical machine component, in this example a permanent magnet 69, is associated with the plurality of inlet guide vanes 66. The first and second electrical machine components contribute to or resist the rotation of the inlet guide vanes 66.

In the illustrated example, the electrical stator windings 68 are spaced circumferentially about the fan nacelle 18 proximate to the outer end 71 of each of the inlet guide vanes 66. However, it should be understood that other actuating components are also within the contemplation and scope of this disclosure.

Figure 2:
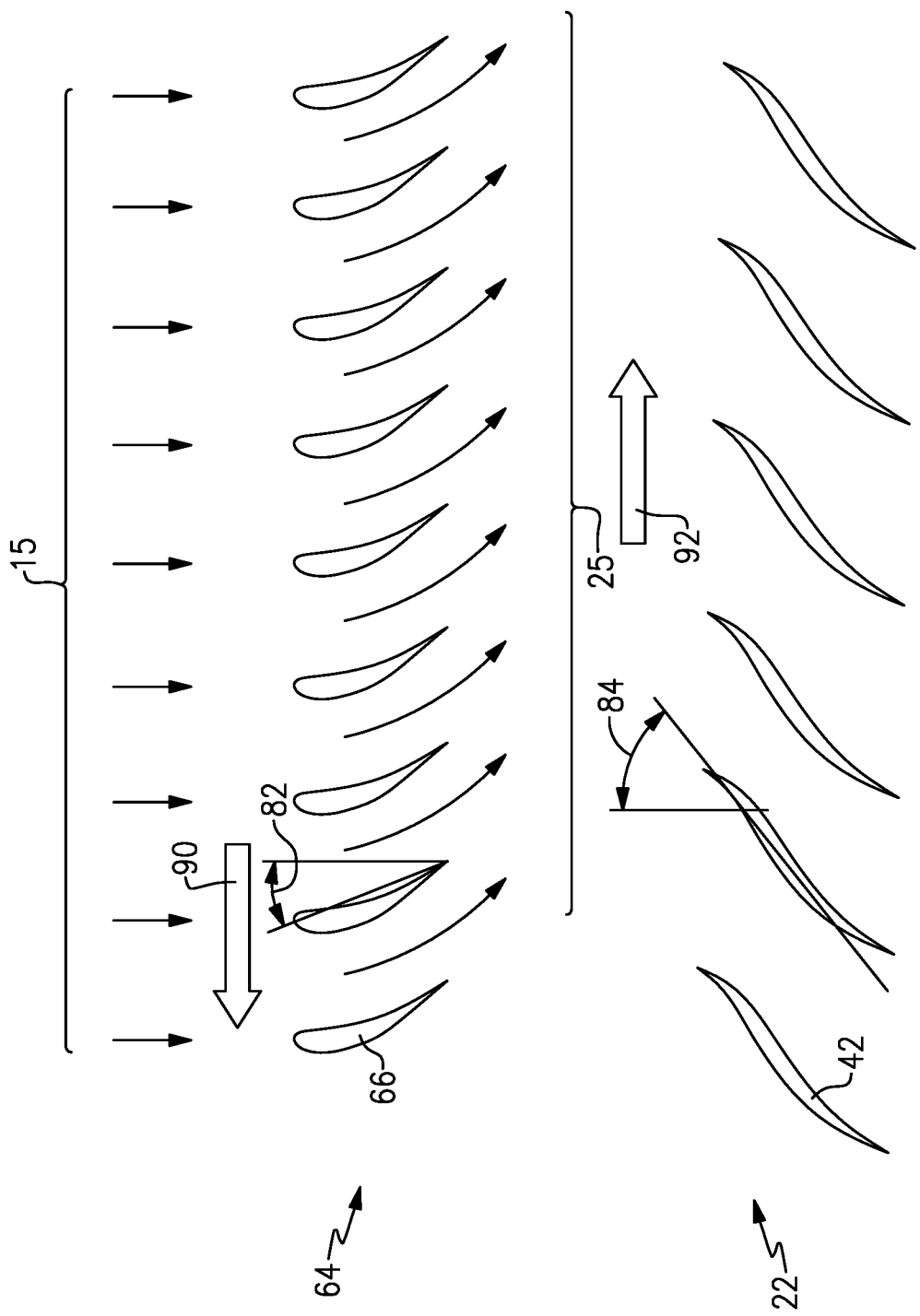
FIG. 2 is a schematic view of an example fan section and an inlet guide vane system.

As illustrated in FIG. 2, with continued reference to FIG. 1, circumferential section A-A, the inlet guide vanes 66 each include a pitch angle 82. The fan blades 42 also include a pitch angle 84. The pitch angle 84 of the fan blades 42 is different than the pitch angle 82 provided by the inlet guide vanes 66. The pitch angle 82 provided by the inlet guide vanes 66 is provided to generate a beneficial and predefined direction to airflow 25 entering the fan section 22. The beneficial airflow 25, in one disclosed example is imparted with a circumferential directed component or pre-swirl that increases fan section propulsive efficiency.

The electrical stator windings 68 are powered through an electric conduit 80 in communication with a controller 72. The controller 72 may be an independent stand-alone component or part of a flight full authority digital engine controller (FADEC), schematically shown at 74. The controller 72 allows the inlet guide vane system 64 to operate in at least three different operational states.

In all operational states of the inlet guide vane system 64, inlet airflow 15 enters the nacelle inlet 88 in a direction substantially parallel to the engine axis A. The rate of flow (kg/sec) of the inlet airflow 15 varies with the rotational speed of the fan shaft 47 and the flight condition. The inlet guide vanes 66 impart a preswirl, schematically shown at 25, to the inlet airflow 15. The preswirled airflow is communicated to the fan blades 42 in a beneficial manner that increases the efficiency at which the fan blades 42 generate propulsive thrust at various rotational speeds of the fan shaft 47 and corresponding speeds (meter/sec) of fan blades 42 The preswirl changes the pressure ratio of fan section 22. The preswirl is rotated in a direction indicated by arrow 90 opposite a direction of the fan blades 42 indicated by arrow 92. Changing the wheel speed of the inlet guide vanes 66 changes the preswirl schematically shown at 25 and further changes the pressure ratio of fan section 22.

In a first operational state, the electrical stator windings 68 generate a time varying magnetic field which applies a force to the permanent magnet 69 to induce the inlet guide vanes 66 to rotate about the axis A in a direction indicated by arrow 90 opposite a direction of the fan blades 42 indicated by arrow 92. When the inlet guide vanes 66 are driven by the electrical stator windings 68, the inlet guide vanes 66 do not generate or create a pressure increase that contributes to thrust. Instead, the inlet guide vanes 66 induce swirl to the inlet airflow 15 to change the angle of airflow 25 as well as condition the flow field of airflow 25. This conditioning of the airflow 25 delivered to the fan section 22 enables the fan section 22 to do more work and achieve a higher pressure ratio for certain operational conditions. The speed of rotation of fan shaft 47 depends on the fuel flow rate combusted in combustor 56 and the flight condition. The speed of rotation of the inlet guide vanes 66 is controlled by varying the magnetic field of the electrical stator windings 68. By adjusting and tailoring a relative speed between the inlet guide vanes 66 and the fan blades 42, the inlet guide vane system 64 can achieve a desired fan pressure ratio for the fan section 22. Adjustments to the fan pressure ratio increases or reduces the thrust generated by the fan section 22 given current environmental and operational conditions at a greater level of efficiency. In one example, the controller 72 sets the guide vane system to the first operation state with a higher rotational speed of guide vanes 66 to reduce swirl and increase fan pressure ratio in response to a takeoff and/or a climb operating condition. In a second example, the controller 72 sets the guide vane system 64 to the first operation state with a lower rotational speed of guide vanes 66 to increase swirl to moderate fan pressure ratio to a lower level in response to a bucket cruise operating condition.

In a second operational state, the passive magnetic field of the electrical stator windings 68 holds the inlet guide vanes 66 in a fixed position relative to the fan nacelle 18 to redirect the airflow 25 in a beneficial manner in response to a still low power output by engine 20. In one example, the controller sets the guide vane system to the second operational state in response to an aircraft operating at lower operating weight, for example, as nearing the end of the cruise segment of a mission.

In a third operational state, the inlet guide vanes 66 are allowed to windmill. The fourth operational state occurs at flight speeds, such as those achieved during an aircraft descending and approach flight conditions. To achieve the third operational state, the controller 72 allows the force of incoming airflow to overcome the resistance of the passive magnetic field generated between the first and second electrical components, which causes the inlet guide vanes 66 to rotate or windmill. In the third operational state and at higher flight speeds, the inlet guide vane system 64 is configured to generate electrical power. During windmilling, the rotation of the permanent magnet 69 relative to the electrical stator windings 68 excites an electrical current within the electrical stator windings 68 and generates electrical power. Additionally, the electrical stator windings 68 may provide a resistive force to control the rotation of the inlet guide vanes 66 during windmilling. In the third operational state, the inlet guide vanes 66 provide a small expansion of the inlet airflow 15. This decreases the pressure of the airflow reaching the fan section 22 and decreases the pressure of the fan nozzle at fan nozzle exit area 96.

When the guide vane system 64 is operating in the third operational state, the controller 72 can rapidly switch the guide vane system 64 to the first operational state to rotate the guide vanes 66 at a faster speed about the axis A. This allows the fan section 22 to increase thrust more quickly, which is beneficial during a go-around or aborted landing condition.

The guide vane system 64 may also be utilized during an in-flight engine restart. During an engine shutdown event, the rotational speed of fan shaft 47 is the windmilling speed of fan blades 42. The preswirl imparted on inlet airflow 15 by guide vanes 66 can change the windmilling speed of fan blades 42. This can facilitate achieving a windmilling speed of the fan shaft 47 required for restarting the engine 20 in flight.

The gas turbine engine 20 further includes a variable area fan nozzle (VAFN) 94. The VAFN 94 defines a fan nozzle exit area 96 between an axially downstream end of the fan nacelle 18 and the core nacelle 19. The VAFN 94 operates to effectively vary the area of the fan nozzle exit area 96 to selectively increase the air flow of the fan section as the rotating inlet guide vanes 66 decreases the pressure ratio of the bypass flow B. Maintaining thrust by increasing fan flow, and decreasing fan pressure and nozzle pressure, produces thrust more efficiently.

In one disclosed example, the controller 72 is in electrical communication with an electrical storage device, such as a battery 73, for storing electrical power generated by the inlet guide vane system 64 in the third operational state. In another example, the electrical power generated by the inlet guide vane system 64 in the third operational state is routed by the controller 72 to the aircraft for on-board usage.

Figure 3:
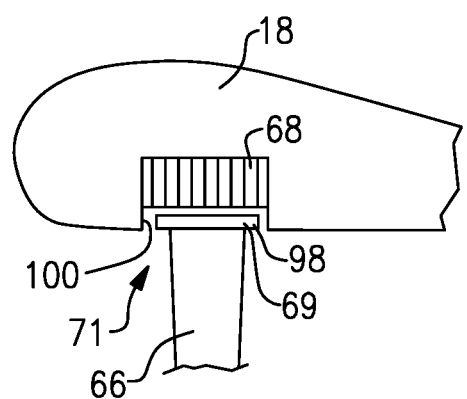
FIG. 3 is an enlarged schematic view of an example inlet guide vane system.

Referring to FIG. 3, in one non-limiting embodiment of the inlet guide vane system 64, the outer ends 71 of the inlet guide vanes 66 are connected by a shroud 98 which forms a continuous ring. As illustrated in FIG. 3, the shroud 98 is at least partially received within a recess 100 of the fan nacelle 18 and the electrical stator windings 68 are located proximate to or within the recess 100. In this embodiment, at least one of the shroud 98 and/or the outer ends 71 of the inlet guide vanes 66 include the permanent magnet 69. Additionally, the shroud 98 may carry the load of the inlet guide vanes 66 during rotation such that a smaller load occurs at the second bearing system 70.

Figure 4:
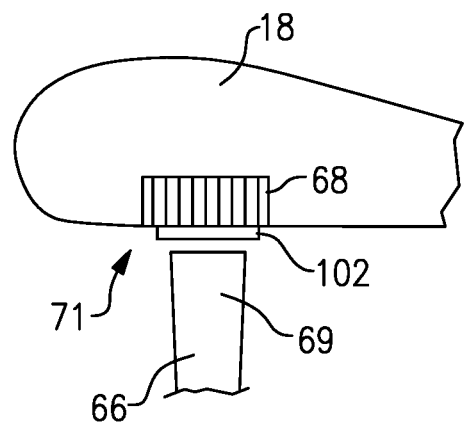
FIG. 4 is an enlarged schematic view of another example inlet guide vane system.

FIG. 4 illustrates another non-limiting embodiment of the inlet guide vane system 64 with the outer end 71 of each of the inlet guide vanes 66 not associated with a shroud 98 but instead including a free tip at the outer ends 71. Furthermore, in this embodiment, a portion of the inlet guide vanes 66 themselves comprise the permanent magnet 69. A wear strip 102 is provided on the fan nacelle 18 proximate to the outer end 71 of the inlet guide vanes 66 to increase the durability of the inlet guide vanes 66 and the electrical stator windings 68 are located within the fan nacelle 18.

Although an example embodiment has been disclosed, a worker of ordinary skill in this art would recognize that this is not intended to be just a material specification and that certain modifications would come within the scope of this disclosure. For that reason, the following claims should be studied to determine the scope and content of this disclosure.

What is claimed is:

1. A gas turbine engine comprising:
    a turbine section configured to drive a fan through a fan shaft, the fan including a plurality of fan blades rotatable about an axis of rotation of the gas turbine engine;
    a fan nacelle including a first electrical machine component, wherein the fan is located within the fan nacelle; and
    a plurality of fan inlet guide vanes including a second electrical machine component, the plurality of fan inlet guide vanes are rotatable about the axis;
    wherein the fan is supported by a first bearing system on the fan shaft, and each of the plurality of fan inlet guide vanes extend from an inner diameter associated with a second bearing system located on a fan hub to a radially outer end.

2. The gas turbine engine of claim 1, wherein the first and second electrical machine components are configured to control rotation of the plurality of fan inlet guide vanes.

3. The gas turbine engine of claim 2, further including a controller configured to communicate with the first electrical machine component to rotate the plurality of inlet guide vanes, hold the plurality of inlet guide vanes in a fixed position, or allow the plurality of inlet guide vanes to windmill.

4. The gas turbine engine of claim 3, wherein the first and second electrical machine components are configured to generate electrical power when the plurality of inlet guide vanes windmill.

5. The gas turbine engine of claim 4, further including an electrical storage device in communication with the controller.

6. The gas turbine engine of claim 2, wherein the first electrical machine component includes a plurality of electrical stator windings and the second electrical machine component includes at least one permanent magnet.

7. The gas turbine engine of claim 1, wherein the radially outer end of each of the plurality of fan inlet guide vanes are connected by a shroud.

8. The gas turbine engine of claim 7, wherein the shroud is configured to be received in a recess of the fan nacelle, and wherein the shroud comprises the second electrical machine component as a permanent magnet, and the first electrical machine component comprises a plurality of electrical stators associated with the recess of the fan nacelle.

9. The gas turbine engine of claim 1, wherein the radially outer end of each of the plurality of fan inlet guide vanes is a free end.

10. The gas turbine engine of claim 9, wherein a portion of each of the plurality of fan inlet guide vanes includes the second electrical machine component and the second electrical machine component is a permanent magnet.

11. The gas turbine engine of claim 1, wherein the plurality of fan inlet guide vanes are rotatable independent of the fan and in a direction opposite to the fan.

12. The gas turbine engine of claim 1, further including a geared architecture driven by the turbine section, the geared architecture driving the fan at a speed different than the turbine section.

13. The gas turbine engine of claim 1, wherein the fan nacelle includes a variable area fan nozzle configured to vary a fan nozzle exit area.

14. A method of operating a turbofan engine comprising:
    rotating a fan assembly having a fan connected to a fan shaft within a fan nacelle about a gas turbine engine axis; and
    controlling the rotation of a fan inlet guide vane assembly having a plurality of fan inlet guide vanes about the gas turbine engine axis using at least one electrical machine component located in the fan nacelle, wherein the fan is supported by a first bearing system on the fan shaft, and each of the plurality of fan inlet guide vanes extend from an inner diameter associated with a second bearing system located on a fan hub to a radially outer end.

15. The method of claim 14, further including imparting a predefined direction of airflow into the fan assembly using the fan inlet guide vane assembly.

16. The method of claim 14, further including inducing the fan inlet guide vane assembly to rotate by generating a magnetic field with the at least one electrical machine component.

17. The method of claim 14, further including rotating the fan inlet guide vane assembly in a direction opposite the fan.

18. The method of claim 14, further including holding the fan inlet guide vane assembly in a fixed position with the at least one electrical machine component.

19. The method of claim 14, further including windmilling the fan inlet guide vane assembly.

20. The method of claim 19, further including generating electrical power using the at least one electrical machine component.

21. The method of claim 14, wherein the fan is located axially forward of a bypass duct relative to a flow of air through the gas turbine engine.

22. The method of claim 14, wherein rotating the fan assembly within the fan nacelle directs air into a bypass duct located radially outward from a turbine section.

* * * * *